(12) United States Patent
Maruyama et al.

(10) Patent No.: US 11,702,340 B2
(45) Date of Patent: Jul. 18, 2023

(54) SINGLE-WALLED CARBON NANOTUBE AND STRUCTURE HAVING LAYER LAMINATED ON SAID SINGLE-WALLED CARBON NANOTUBE, AND METHOD FOR PRODUCING SAME

(71) Applicant: THE UNIVERSITY OF TOKYO, Tokyo (JP)

(72) Inventors: Shigeo Maruyama, Tokyo (JP); Rong Xiang, Tokyo (JP); Taiki Inoue, Tokyo (JP)

(73) Assignee: THE UNIVERSITY OF TOKYO, Tokyo (JP)

(*) Notice: Subject to any disclaimer, the term of this patent is extended or adjusted under 35 U.S.C. 154(b) by 90 days.

(21) Appl. No.: 16/979,124

(22) PCT Filed: Mar. 7, 2019

(86) PCT No.: PCT/JP2019/009122
§ 371 (c)(1),
(2) Date: Sep. 8, 2020

(87) PCT Pub. No.: WO2019/172379
PCT Pub. Date: Sep. 12, 2019

(65) Prior Publication Data
US 2020/0399128 A1    Dec. 24, 2020

Related U.S. Application Data

(60) Provisional application No. 62/640,596, filed on Mar. 9, 2018.

(51) Int. Cl.
*C01B 32/159*    (2017.01)
*C01B 32/16*    (2017.01)

(52) U.S. Cl.
CPC ............ *C01B 32/159* (2017.08); *C01B 32/16* (2017.08); *C01P 2004/13* (2013.01)

(58) Field of Classification Search
CPC ... C01B 32/159; C01B 32/16; C01B 21/0648; C01B 32/168; C01B 2202/02;
(Continued)

(56) References Cited

U.S. PATENT DOCUMENTS

2004/0186220 A1* 9/2004 Smalley ................. B82Y 10/00
                                                        524/556
2004/0232426 A1  11/2004 Graham et al.
2007/0048211 A1* 3/2007 Jiang ...................... B82Y 30/00
                                                        422/186

FOREIGN PATENT DOCUMENTS

JP    2003-146631    5/2003
JP    2004-533936    11/2004
JP    2005-314162    11/2005

OTHER PUBLICATIONS

Jing, et al., Coaxial carbon@boron nitride nanotube arrays with enhanced thermal stability and compressive mechanical properties, Nanoscale 2016; 8: 11114-11122 with Electronic Supplementary Information (Year: 2016).*

(Continued)

*Primary Examiner* — Daniel C. McCracken
(74) *Attorney, Agent, or Firm* — Daniel F. Nesbitt; Nesbitt IP LLC (57) ABSTRACT

The present invention provides a laminate structure in which the properties of a single-walled CNT, which are susceptible to surrounding environment, are stabilized by protecting the surface of the single-walled CNT with a proper substance, and/or another property is imparted to the single-walled CNT. The present invention provides a structure which comprises a first single-walled carbon nanotube having a length of 50 nm or longer, preferably 100 nm or longer, and (Continued)

a second layer laminated on the first single-walled carbon nanotube, wherein the second layer comprises at least one substance selected from the group A consisting of first boron nitride, first transition metal dichalcogenide, second carbon, first black phosphorus and first silicon.

17 Claims, 7 Drawing Sheets

(58) Field of Classification Search
CPC ............ C01B 2202/34; C01B 2202/36; C01B 32/158; C01B 32/162; C01B 32/164; C01B 32/166; C01B 32/17; C01B 32/172; C01B 32/174; C01B 32/176; C01B 32/178; C01B 2202/00; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01P 2004/13; C01G 39/06; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

OTHER PUBLICATIONS

Yuan, et al., Structural stability of a coaxial carbon nanotube inside a boron-nitride nanotube, Carbon 2011; 49: 677-683 (Year: 2011).*
Su, et al., The field emission characteristics of carbon nanotubes coated by boron nitride film, Diamond & Related Materials 2007; 16: 1393-1397 (Year: 2007).*
Chen, et al., Synthesis of Boron Nitride Coating on Carbon Nanotubes, J. Am. Ceram. Soc. 2004; 87(1): 147-151 (Year: 2004).*
"Research Area," accessed online at http://www.photon.t.u-tokyo.ac.jp/research.html#hetero on Aug. 29, 2022 (Year: 2022).*
Iijima, Helical microtubules of graphitic carbon, Nature 1991; 354: 56-58 (Year: 1991).*
Murakami et al., "Growth of vertically aligned single-walled carbon nanotube films on quartz substrates and their optical anisotropy", 2004, Chem. Phys. Lett. vol. 385, p. 298-303 (6 pages).
Dean et al., "Boron Nitride Substrates for High-Quality Graphene Electronics", 2010, Nature Nanotechnology vol. 5, p. 722-726 (5 pages).
Levendorf et al., "Graphene and boron nitride lateral heterostructures for atomically thin circuitry", 2012, Nature vol. 488, p. 627-632 (6 pages).
Nguyen et al., "Resonant tunnelling diodes based on graphene/h-BN heterostructure", 2012, J. Phys. D: Applied Physics vol. 45, 325104 (5 pages).
Wang et al., "Negligible Environmental Sensitivity of Graphene in a Hexagonal Boron Nitride/Graphene/h-BN Sandwich Structure", 2012, ACS Nano vol. 6, p. 9314-19 (6 pages).
Liu et al., "In-plane heterostructures of graphene and hexagonal boron nitride with controlled domain sizes", 2013, Nature Nanotech. vol. 8, p. 119-124 (6 pages).

Wang et al., "One-Dimensional Electrical Contact to a Two-Dimensional Material", 2013, Science vol. 342, p. 614-617 (4 pages).
Franklin et al., "Carbon Nanotube Complementary Wrap-Gate Transistors", 2013, Nano Letters vol. 13, p. 2490-2495 (6 pages).
Pakdel et al., "Nano boron nitride flatland", 2014, Chem. Soc. Rev. vol. 43, p. 934-959 (26 pages).
Hattori et al., "Layer-by-Layer Dielectric Breakdown of Hexagonal Boron Nitride", 2015, ACS Nano vol. 9, p. 916-921 (6 pages).
Huang et al., "Superior Current Carrying Capacity of Boron Nitride Encapsulated Carbon Nanotubes with Zero-Dimensional Contacts", 2015, Nano Letters vol. 15, p. 6836-40 (5 pages).
Liu et al., "Thermal Conductance of the 2D MoS2/h-BN and Graphene/h-BN Interfaces", 2017, Scientific Reports vol. 7, 43886 (8 pages).
Park et al., "Hysteresis-Free Carbon Nanotube Field-Effect Transistors", 2017, ACS Nano vol. 11, p. 4785-4791 (7 pages).
Suenaga et al., "Synthesis of nanoparticles and nanotubes with well-separated layers of boron nitride and carbon", 1997, Science vol. 278, p. 653-655 (3 pages).
Mickelson et al., "Packing C60 in boron nitride nanotubes", 2003, Science vol. 300, p. 467-469 (3 pages).
Chen et al., "Synthesis of Boron Nitride Coating on Carbon Nanotubes", 2004, J. Am. Ceram. Soc. vol. 87, p. 147-151 (5 pages).
Liu et al., "Direct growth of graphene/hexagonal boron nitride stacked layers", 2011, Nano Lett. vol. 11, p. 2032-2037 (6 pages).
Arenal et al., "In Situ Formation of Carbon Nanotubes Encapsulated within Boron Nitride Nanotubes via Electron Irradiation", 2014, ACS Nano vol. 8, p. 8419-8425 (7 pages).
Tay et al., "Facile Synthesis of Millimeter-Scale Vertically Aligned Boron Nitride Nanotube Forests by Template-Assisted Chemical Vapor Deposition", 2015, Chem. Mater, vol. 27, p. 7156-7163 (8 pages).
Walker et al., "Growth of Carbon Nanotubes inside Boron Nitride Nanotubes by Coalescence of Fullerenes: Toward the World's Smallest Coaxial Cable", 2017, Small Methods vol. 1, 1700184 (9 pages).
International Search Report and Written Opinion dated Apr. 2, 2019, in corresponding Application No. PCT/JP2019/009122 filed Mar. 7, 2019 (6 pages) with Google machine translation (3 pages).
International Preliminary Report on Patentability (Chapter I) dated Sep. 15, 2020, in corresponding Application No. PCT/JP2019/009122 filed Mar. 7, 2019 (4 pages) with WIPO translation (5 pages).
Jeong et al., "Compressible elastomeric aerogels of hexagonal boron nitride and single-walled carbon nanotubes", Jun. 2015, Nanoscale, vol. 7 p. 12888-12894 (7 pages).
Hu et al., "Nitric Acid Purification of Single-Walled Carbon Nanotubes", Nov. 19, 2003, J. Phys. Chem., vol. 107, p. 13838-13842 (5 pages).
Duong et al., "Thermal Degradation of Single-Walled Carbon Nanotubes", Apr. 18, 2008, Japanese Journal of Applied Physics, vol. 47 No. 4, p. 1994-1999 (6 pages).
Bom et al., "Thermogravimetric Analysis of the Oxidation of Multiwalled Carbon Nanotubes: Evidence for the Role of Defect Sites in Carbon Nanotube Chemistry", May 3, 2002, Nano Letters, vol. 2 No. 6, p. 615-619 (5 pages).
Maruyama et al., "Physics and applications of nanotubes", Feb. 24, 2022, J. Appl. Phys., vol. 131, No. 080401 (5 pages).
Chen et al., "Horizontally Aligned Carbon Nanotube Based Biosensors for Protein Detection", Sep. 29, 2016, Bioengineering, vol. 3 No. 23 (10 pages).

* cited by examiner

SINGLE-WALLED CARBON NANOTUBE AND STRUCTURE HAVING LAYER LAMINATED ON SAID SINGLE-WALLED CARBON NANOTUBE, AND METHOD FOR PRODUCING SAME

CROSS-REFERENCE TO RELATED APPLICATIONS

The present application is the National Stage of International Application No. PCT/JP2019/009122 filed Mar. 7, 2019, which claims the benefit of U.S. Provisional Application No. 62/640,596 filed Mar. 9, 2018, the disclosures of which are incorporated herein by reference in their entireties.

TECHNICAL FIELD

The present invention relates to a structure comprising a 1st single-walled carbon nanotube and a layer layered on the 1st single-walled carbon nanotube, and a method of manufacturing the structure.

Further, the present invention relates to a material using the structure.

BACKGROUND ART

Carbon nanotubes (CNTs) have excellent electrical, mechanical and thermal properties. In particular, the single-walled CNT made of only one layer exhibits metallic or semiconductor property, depending on the geometrical structure, and thus is expected to have various applications including electronic devices such as transistors.

In order to apply the single-walled CNT to electronic and optical devices, there is a need to resolve a problem: it is difficult to create the single-walled CNT with different conduction characteristics, and in addition, the properties of the single-walled CNT are easily affected by the surrounding environment. This is because in the single-walled CNT, all the constituent atoms are present on the surface thereof, and their properties change greatly depending on the gas molecules adsorbed on the surface, the substrate in contact therewith, and the like.

Therefore, it is considered effective to protect the surface of the single-walled CNT with an appropriate substance.

Non-Patent Document 1 disclosed is a structure in which, the multi-layered boron nitride nanotube (hereinafter, the boron nitride nanotube may be abbreviated as a "BNNT") is layered on the surface of a multi-walled CNT, not a single-walled CNT. Non-Patent Document 2 have disclosed a composite structure of the BNNT and the CNT for the first time, and discloses that the structure is formed by a laser oven.

However, in the structure, the CNT is multi-layered and the BNNT is also multi-layered, and the layered order and the number of layers are not controlled.

Non-Patent Documents 2 to 4 disclose that after the preparation of the BNNT, a carbon source is put into the BNNT to synthesize the single-walled CNT in the BNNT.

Specifically, it is disclosed that $C_{60}$ fullerene and amorphous carbon are encapsulated in the BNNT, and, after that, the CNT, specifically the single-walled CNT, is formed by electron beam irradiation and heating in Ar. Namely, Non-Patent Documents 3 to 5 disclose that a product in which the single-walled CNT is covered with a layer of the BNNT has been obtained for the first time.

However, the length of the product obtained was limited to short ones. In addition, there is a problem that the product is not synthesized while maintaining the aligned structure of the BNNT, and the amount of synthesized product is small.

More, Non-Patent Documents 5 and 6 disclose that a structure comprising a BNNT layered on a multi-walled CNT was synthesized by using $H_3BO_3$ and $NH_3$ as a BNNT source. Here, it is considered that the reason why the multi-walled CNT is used is that while the single-walled CNT has a structure that is likely to be damaged due to the high-temperature treatment, compared to the multi-walled CNT, the multi-walled CNT does not suffer such damage or small damage. Specifically, it is considered that the reason why the multi-walled CNT is used is that the damage to the single-walled CNT is large when the source gas contains oxygen atoms.

Also, Non-Patent Document 7 discloses that h-BN sheets are synthesized on graphene using $BH_3NH_3$ as a BNNT source.

PRIOR ART DOCUMENT

Non-Patent Document

Non-Patent Document 1: K. Suenaga, C. Colliex, and N. Demoncy, "Synthesis of nanoparticles and nanotubes with well-separated layers of boron nitride and carbon", Science 278, 653 (1997).

Non-Patent Document 2: W. Mickelson, S. Aloni, W. Q. Han, J. Cumings, and A. Zettl, "Packing C60 in boron nitride nanotubes", Science 300, 467 (2003).

Non-Patent Document 3: R. Arenal and A. Lopez-Bezanilla, "In Situ Formation of Carbon Nanotubes Encapsulated within Boron Nitride Nanotubes via Electron Irradiation", ACS Nano 8, 8419 (2014).

Non-Patent Document 4: K. E. Walker, G. A. Rance, A. Pekker, H. M. Tohati, M. W. Fay, R. W. Lodge, C. T. Stoppiello, K. Kamarás, and A. N. Khlobystov, "Growth of Carbon Nanotubes inside Boron Nitride Nanotubes by Coalescence of Fullerenes: Toward the World's Smallest Coaxial Cable", Small Methods 1, 1700184 (2017).

Non-Patent Document 5: L. Chen, H. Ye, and Y. Gogotsi, "Synthesis of Boron Nitride Coating on Carbon Nanotubes", J. Am. Ceram. Soc. 87, 147 (2004).

Non-Patent Document 6: R. Y. Tay, H. Li, S. H. Tsang, L. Jing, D. Tan, M. Wei, and E. H. T. Teo, "Facile Synthesis of Millimeter-Scale Vertically Aligned Boron Nitride Nanotube Forests by Template-Assisted Chemical Vapor Deposition", Chem. Mater. 27, 7156 (2015).

Non-Patent Document 7: Z. Liu, L. Song, S. Zhao, J. Huang, L. Ma, J. Zhang, J. Lou, and P. M. Ajayan, "Direct growth of graphene/hexagonal boron nitride stacked layers.", Nano Lett. 11, 2032 (2011).

SUMMARY OF INVENTION

Technical Problem

However, there is no example in which a structure is obtained by layering on the single-walled CNT, particularly the single-walled CNT having a relatively long length.

Therefore, an object of the present invention is to provide a layered structure that stabilizes the properties of single-walled CNT that is easily affected by the surrounding environment and/or adds other properties to the single-walled CNT by protecting the surface of the single-walled CNT with an appropriate substance.

Specifically, an object of the present invention is to provide a structure in which another substance is layered on a single-walled CNT, in particular, a single-walled CNT whose length is relatively long, particularly a structure where another substance is layered on the single-walled CNT in a coaxial tubular manner.

Further, other than or in addition to the above object, an object of the present invention is to provide a method of manufacturing the structure.

More, other than or in addition to the above objects, an object of the present invention is to provide a material comprising the above-mentioned structure.

Means for Solving Problems

The present inventors have found the following inventions:

<1> A structure comprising a 1st single-walled carbon nanotube having a length of 50 nm or more, preferably 100 nm or more, more preferably 1 μm or more, most preferably 10 μm or more and a 2nd layer layered on the 1st single-walled carbon nanotube, wherein the 2nd layer is made of at least one selected from the group A consisting of a first boron nitride, a first transition metal dichalcogenide, a second carbon, a first black phosphorus, and a first silicon.

<2> In the above item <1>, the 2nd layer may preferably be made of at least one selected from the group A' consisting of a first boron nitride, a first transition metal dichalcogenide, and a second carbon, more preferably the group A" consisting of a first boron nitride and a first transition metal dichalcogenide.

<3> In the above item <1> or <2>, the 2nd layer may be tubular, preferably tubular that is substantially coaxial with the 1st single-walled carbon nanotube.

<4> In any one of the above items <1> to <3>, the 2nd layer may have two or more layers.

<5> A structure comprising a 1st single-walled carbon nanotube having a length of 10 nm or more, preferably 50 nm or more, more preferably 100 nm or more, further preferably 1 μm or more, most preferably 10 μm or more and a 2'nd layer layered on the 1st single-walled carbon nanotube, wherein the 2'nd layer is a single layer, preferably a tubular single layer, more preferably a tubular single layer that is substantially coaxial with the 1st single-walled carbon nanotube, and the 2'nd layer may be made of at least one selected from the group A consisting of a first boron nitride, a first transition metal dichalcogenide, a second carbon, a first black phosphorus, and a first silicon, preferably the above group A', more preferably the above group A".

<6> In any one of the above items <1> to <5>, the structure may further comprise a 3rd layer, preferably a tubular 3rd layer, more preferably a tubular 3rd layer that is substantially coaxial with the 1st single-walled carbon nanotube, layered on the 2nd layer or the 2'nd layer, wherein the 3rd layer may be made of at least one selected from the group B consisting of a second boron nitride, a second transition metal dichalcogenide, a third carbon, a second black phosphorus, and a second silicon.

<7> In the above item <6>, the 3rd layer may be made of at least one selected from the group B' consisting of a second boron nitride, a second transition metal dichalcogenide and a third carbon, preferably the group B" consisting of a second boron nitride and a second transition metal dichalcogenide.

<8> In the above item <6> or <7>, the structure may further comprise an (n+1)-th layer, preferably a tubular (n+1)-th layer, more preferably a tubular (n+1)-th layer that is substantially coaxial with the 1st single-walled carbon nanotube, layered on an n-th layer where n represents an integer of 3 or more, wherein the (n+1)-th layer may be made of at least one selected from the group C consisting of an n-th boron nitride, an n-th transition metal dichalcogenide, an (n+1)-th carbon, an n-th black phosphorus, and an n-th silicon.

<9> In the above item <8>, the (n+1)-th layer may be made of at least one selected from the group C' consisting of an n-th boron nitride, an n-th transition metal dichalcogenide and an (n+1)-th carbon, preferably the group C" consisting of an n-th boron nitride and an n-th transition metal dichalcogenide.

<10> In any one of the above items <6> to <9>, the n-th layer may have a single layer or two or more layers where n represents an integer of 3 or more.

<11> In any one of the above items <1> to <10>, the 1st single-walled carbon nanotube may have a diameter of 0.4 to 8 nm, preferably 0.6 to 5 nm, more preferably 0.7 to 4 nm, most preferably 1 to 3 nm.

<12> A film comprising a plurality of structures according to any one of the above items <1> to <11>.

<13> A method of manufacturing a structure comprising a 1st single-walled carbon nanotube and a 2nd layer layered on the 1st single-walled carbon nanotube, wherein the 2nd layer is made of at least one selected from the group A consisting of a first boron nitride, a first transition metal dichalcogenide, a second carbon, a first black phosphorus, and a first silicon, the method comprising the steps of:

1a) preparing the 1st single-walled carbon nanotube, and placing the prepared 1st single-walled carbon nanotube at a predetermined location;

1b) flowing a gas serving as a source of the 2nd layer into the predetermined location; and 1c) heating the predetermined location, for example, heating the predetermined location to the temperature required to form the 2nd layer from the gas, specifically, for example, if the 2nd layer is made of the first boron nitride, heating the predetermined location at the temperature of 700 to 1500° C., preferably 800 to 1400° C., more preferably 900 to 1300° C., and, for example, if the 2nd layer is made of the first transition metal dichalcogenide, heating the predetermined location at the temperature of 400 to 1200° C., preferably 450 to 1100° C., more preferably 450 to 1000° C.;

to obtain the structure.

<14> In the above item <13>, the 1st single-walled carbon nanotube prepared in the step 1a) may be a first film comprising a plurality of the 1st single-walled carbon nanotubes, and the structure may be a second film comprising a plurality of the structures.

<15> The single-walled carbon nanotube prepared in the step 1a) of the above item <13> or <14> may have a length of 10 nm or more, preferably 50 nm or more, more preferably 100 nm or more, further preferably 1 μm or more, most preferably 10 μm or more.

<16> A method of manufacturing a structure, the method comprising the steps of:

2a) placing the structure obtained by the method according to any one of the above items <13> to <15> at a predetermined location;

2b) flowing a gas serving as a source of a 3rd layer into the predetermined location; and 2c) heating the predetermined location, for example, heating the predetermined location to the temperature required to form the 3rd layer from the gas, specifically, for example, if the 3rd layer is made of the second boron nitride, heating the predetermined location at the temperature of 700 to 1500° C., preferably 800 to 1400° C., more preferably 900 to 1300° C., and, for example, if the 3rd layer is made of the first transition metal dichalcogenide, heating the predetermined location at the temperature of 400 to 1200° C., preferably 450 to 1100° C., more preferably 450 to 1000° C.;

to obtain a structure comprising the 3rd layer layered on the 2nd layer of the structure.

<17> The method according to the above item <16>, may further comprise the steps of:

ma) placing a structure comprising an m-th layer at a predetermined location;

mb) flowing a gas serving as a source of an (m+1)-th layer into the predetermined location where m is an integer of 2 or more; and mc) heating the predetermined location, for example, heating the predetermined location to the temperature required to form the (m+1)-th layer from the gas, specifically, for example, if the (m+1)-th layer is made of the m-th boron nitride, heating the predetermined location at the temperature of 700 to 1500° C., preferably 800 to 1400° C., more preferably 900 to 1300° C., and, for example, if the (m+1)-th layer is made of the m-th transition metal dichalcogenide, heating the predetermined location at the temperature of 400 to 1200° C., preferably 450 to 1100° C., more preferably 450 to 1000° C.;

to obtain the structure comprising the (m+1)-th layer layered on the m-th layer of the structure.

<18> In an hb) step, where h is an integer of 1 or more, of any one of the above items <13> to <17>, a carrier gas, for example, a carrier gas selected from the group consisting of an Ar gas, an Ar/$H_2$ gas, a He gas, a He/$H_2$ gas, and an $N_2$ gas may be flowed in.

Further, the present inventors have found the following inventions:

<P1> A structure comprising a 1st single-walled carbon nanotube and a 2nd layer layered on the 1st single-walled carbon nanotube, wherein the 2nd layer is made of at least one selected from the group A consisting of a first boron nitride, a first transition metal dichalcogenide (for example, $MoS_2$, $WSe_2$), a second carbon, a first black phosphorus, and a first silicon.

<P2> In the above item <P1>, the 1st single-walled carbon nanotube may have a length of 4 μm or more, preferably 10 μm or more, more preferably an order of several hundred micrometers.

<P3> In the above item <P1> or <P2>, the group A may be preferably at least one selected from the group A' consisting of a first boron nitride, and a second carbon. The 2nd layer made of the second carbon may be a single-walled. The 2nd layer made of the first boron nitride may be a single-walled to tenth-walled.

<P4> In any one of the above items <P1> to <P3>, the 2nd layer may be tubular, preferably tubular that is substantially coaxial with the 1st single-walled carbon nanotube.

<P5> In any one of the above items <P1> to <P4>, a diameter of the 2nd layer may be several nanometers.

<P6> In any one of the above items <P1> to <P5>, a diameter of the 1st single-walled carbon nanotube may be 0.4 to 8 nm, preferably 0.8 to 3 nm.

<P7> In any one of the above items <P1> to <P6>, a shape of the 1st single-walled carbon nanotube may be selected from the group consisting of a vertically aligned single-walled carbon nanotube, a suspended single-walled carbon nanotube, a horizontally aligned single-walled carbon nanotube, and a randomly aligned single-walled carbon nanotube (for example, a film made of a plurality of randomly aligned single-walled carbon nanotubes).

<P8> In any one of the above items <P1> to <P6>, the structure may further comprise a 3rd layer, preferably a tubular 3rd layer, more preferably a tubular 3rd layer that is substantially coaxial with the 1st single-walled carbon nanotube, and the 3rd layer may be made of at least one selected from the group B consisting of a second boron nitride, a second transition metal dichalcogenide, a third carbon, a second black phosphorus, and a second silicon.

<P9> In the above item <P8>, the structure may further comprise an (n+1)-th layer, preferably a tubular (n+1)-th layer, more preferably a tubular (n+1)-th layer that is substantially coaxial with the 1st single-walled carbon nanotube layered on an n-th layer (n represents an integer of 3 or more), and the (n+1)-th layer may be made of at least one selected from the group C consisting of an n-th boron nitride, an n-th transition metal dichalcogenide, an (n+1)-th carbon, an n-th black phosphorus, and an n-th silicon.

<P10> A film comprising a plurality of structures according to any one of the above items <P1> to <P9>.

<P11> A method of manufacturing a structure comprising a 1st single-walled carbon nanotube and a 2nd layer layered on the 1st single-walled carbon nanotube, the 2nd layer is made of at least one selected from the group A consisting of a first boron nitride, a first transition metal dichalcogenide, a second carbon, a first black phosphorus, and a first silicon, the method comprising the steps of:

1a) preparing the 1st single-walled carbon nanotube, and placing the prepared 1st single-walled carbon nanotube at a predetermined location;

1b) flowing a gas serving as a source of the 2nd layer into the predetermined location; and 1c) heating the predetermined location, to obtain the structure.

<P12> In the above item <P11>, the step of 1c) heating may be carried out by heating the predetermined location to the temperature required to form the 2nd layer from the gas, specifically heating, for example, at the temperature of 800 to 1500° C., for example, 1000 to 1050° C.

<P13> In the above item <P11> or <P12>, the 1st single-walled carbon nanotube prepared in the step 1a) may be a first film comprising a plurality of the 1st single-walled carbon nanotubes, and the structure may be a second film comprising a plurality of the structures.

<P14> The 1st single-walled carbon nanotube prepared in the step 1a) of any one of the above items <P11> to <P13> may have a length of 4 μm or more, preferably 10 μm or more nm or more, more preferably an order of several hundred micrometers.

<P15> The method may further comprise the steps of:

2a) placing the structure obtained by the method according to any one of the above items <P11> to <P14> at a predetermined location;

2b) flowing a gas serving as a source of a 3rd layer into the predetermined location; and 2c) heating the predetermined location;

to obtain a structure comprising the 3rd layer layered on the 2nd layer of the structure.

<P16> In the above item <P15>, the step of 2c) heating may be carried out by heating the predetermined location to the temperature required to form the 3rd layer from the gas.

<P17> The method according to the above item <P15> or <P16>, may further comprise the steps of:

ma) placing a structure comprising an m-th layer at a predetermined location;

mb) flowing a gas serving as a source of an (m+1)-th layer into the predetermined location where m is an integer of 2 or more; and mc) heating the predetermined location;
to obtain the structure comprising the (m+1)-th layer layered on the m-th layer of the structure.

<P18> In an hb) step, where his an integer of 1 or more, of any one of the above items <P11> to <P17>, a carrier gas, for example, an Ar gas, or an $Ar/H_2$ gas may be flowed in.

Effects of the Invention

The present invention can provide a layered structure that stabilizes the properties of single-walled CNT that is easily affected by the surrounding environment and/or adds other properties to the single-walled CNT by protecting the surface of the single-walled CNT with an appropriate substance.

Specifically, the present invention can provide a structure in which another substance is layered on a single-walled CNT, in particular, a single-walled CNT whose length is relatively long, in particular, a structure where another substance is layered on the single-walled CNT in a coaxial tubular manner.

Further, other than or in addition to the above effects, the present invention can provide a method of manufacturing the structure.

More, other than or in addition to the above effects, the present invention can provide a material comprising the above-mentioned structure.

DESCRIPTION OF EMBODIMENTS

Hereinafter, the invention described in the present application will be described in detail.

In an aspect, the present application provides a structure comprising a 1st single-walled carbon nanotube having a length of 50 nm or more, preferably 100 nm or more, more preferably 1 μm or more, most preferably 10 μm or more and a 2nd layer layered on the 1st single-walled carbon nanotube, wherein the 2nd layer is made of at least one selected from the group A consisting of a first boron nitride, a first transition metal dichalcogenide, a second carbon, a first black phosphorus, and a first silicon.

In addition, in another aspect, the present application provides a structure comprising a 1st single-walled carbon nanotube having a length of 10 nm or more, preferably 50 nm or more, more preferably 100 nm or more, still more preferably 1 μm or more, most preferably 10 μm or more, and a 2'nd layer layered on the 1st single-walled carbon nanotube, wherein the 2'nd layer is a single layer, preferably a tubular single layer, preferably a tubular single layer that is substantially coaxial with the 1st single-walled carbon nanotube, and the 2'nd layer is made of at least one selected from the group A consisting of a first boron nitride, a first transition metal dichalcogenide, a second carbon, a first black phosphorus, and a first silicon.

Further, the present application provides a film comprising a plurality of the above structures.

The present application also provides a material comprising the above structure.

Further, the present application provides a method of manufacturing the above structure.

Hereinafter, description will be made in order. Regarding the above structure, common items are:

<Structure>

The structure of the present invention is a structure comprising a 1st single-walled carbon nanotube and a 2nd layer or a 2'nd layer layered on the 1st single-walled carbon nanotube.

<<1st Single-Walled Carbon Nanotube>>

In an aspect, the 1st single-walled carbon nanotube of the present invention may have a length of 50 nm or more, preferably 100 nm or more, more preferably 1 μm or more, most preferably 10 μm or more.

And in another respect, the 1st single-walled carbon nanotube of the present invention may have a length of 10 nm or more, preferably 50 nm or more, more preferably 100 nm or more, still more preferably 1 μm or more, most preferably 10 μm or more.

The 1st single-walled carbon nanotube of the present invention may have a diameter of 0.4 to 8 nm, preferably 0.6 to 5 nm, more preferably 0.7 to 4 nm, most preferably 1 to 3 nm.

The shape of the first single-walled carbon-carbon nanotube is not particularly limited. For example, examples of the shape may include, but is not limited to, vertically aligned single-walled carbon-carbon nanotube, horizontally aligned single-walled carbon-carbon nanotube, a mixture of various aligned single-walled carbon-carbon nanotube, one kind or plural kinds thereof existences, and a combination thereof.

<<2nd Layer>> and <<2'Nd Layer>>

The structure of the present invention comprises a 2nd layer or a 2'nd layer layered on the 1st single-walled carbon nanotube.

In terms of "layered", the 2nd layer or the 2'nd layer may be layered on a portion of the 1st single-walled carbon nanotube, and preferably, it may preferably be layered on the entire 1st single-walled carbon nanotube.

The state of "layered" depends on the method of manufacturing the structure of the present invention. For example, when the first single-walled carbon-carbon nanotube has a horizontally aligned shape on the substrate described above, the 2nd layer or the 2'nd layer is preferably "layered" at a location other than the location in contact with the substrate. In addition, for example, as described above, the first single-walled carbon-carbon nanotube is a mixture of various alignment, and when contacting with another single-walled carbon nanotube due to the various alignment, the 2nd layer or the 2'nd layer is preferably "layered" at a location other than the contact location.

The 2nd layer or the 2'nd layer may be made of at least one selected from the group A consisting of a first boron nitride, a first transition metal dichalcogenide, a second carbon, a first black phosphorus, and a first silicon, preferably the group A' consisting of a first boron nitride, a first transition metal dichalcogenide, and a second carbon, more preferably the group A" consisting of a first boron nitride and a first transition metal dichalcogenide.

The transition metal dichalcogenide is a compound represented by "MCh2" where M represents a transition metal such as Mo, W, Ti, Zr, Hf, Nb, and Ta, and Ch represents a chalcogen element, S, Se, and Te, and examples thereof include $MoS_2$ and $WSe_2$.

The terms "at least one" herein means that it may be made of only one kind, or may be made of two or more kinds. A case where the $2^{nd}$ layer is made of two or more kinds means a case where for example, a layer of the first boron nitride is layered on a portion of the first single-walled carbon-carbon nanotube, and a layer of the first transition metal dichalcogenide is layered on a portion other than the portion.

The 2nd layer or the 2'nd layer may be tubular, preferably tubular substantially coaxial with the 1st single-walled carbon nanotube.

The 2nd layer may be one layer or two or more layers.

The 2'nd layer is defined as a single layer, as described above.

The "layer" of the 2nd layer or the 2'nd layer may have a thickness of 0.2 to 50 nm, preferably 0.3 to 20 nm, more preferably 0.3 to 10 nm, most preferably 0.3 to 3 nm.

More, the "layer" of the 2nd layer or the 2'nd layer may be made of atomic layer substance. The term "atomic layer substance" herein is also referred to as a two-dimensional substance, a layered substance, or the like, and refers to a substance group having a thickness of one atom to several atoms and a two-dimensional atomic structure.

It can be determined by a transmission electron microscope, an electron diffraction, a Raman spectroscopy, an optical absorption spectroscopy, or a fluorescence spectroscopy, whether the layer is made of an "atomic layer substance (two-dimensional substance or layered substance)" or not.

<<3rd Layer>>

The structure of the present invention may comprise a 3rd layer layered on the above-mentioned 2nd layer or 2'nd layer.

The 3rd layer may be a tubular layer, more preferably a tubular layer that is substantially coaxial with the 1st single-walled carbon nanotube.

The 3rd layer may be made of at least one selected from the group B consisting of a second boron nitride, a second transition metal dichalcogenide, a third carbon, a second black phosphorus, and a second silicon, preferably the group B' consisting of a second boron nitride, a second transition metal dichalcogenide, and a third carbon, more preferably the group B" consisting of a second boron nitride and a second transition metal dichalcogenide.

As in the 2nd layer, the 3rd layer may have a thickness of 0.2 to 50 nm, preferably 0.3 to 20 nm, more preferably 0.3 to 10 nm, most preferably 0.3 to 3 nm.

Further, the 3rd layer may be made of the atomic layer substance.

The terms "layered", "layer", and "atomic layer substance" are as described above.

<<N-Th Layer>>

The structure of the present invention may comprise an (n+1)-th layer further layered on the n-th layer where n represents an integer of 3 or more.

The (n+1)-th layer may be made of at least one selected from the group C consisting of an n-th boron nitride, an n-th transition metal dichalcogenide, an (n+1)-th carbon, an n-th black phosphorus, and an n-th silicon, preferably the group C' consisting of an n-th boron nitride, an n-th transition metal dichalcogenide, and an (n+1)-th carbon, more preferably the group C" consisting of an n-th boron nitride nanotube and an n-th transition metal dichalcogenide.

The n-th layer may be a single layer or may have two or more layers where n represents an integer of 3 or more.

The (n+1)-th layer may have a thickness of 0.2 to 50 nm, preferably 0.3 to 20 nm, more preferably 0.3 to 10 nm, most preferably 0.3 to 3 nm, as in the 2nd layer or the 3rd layer.

Further, the (n+1)-th layer may be made of the atomic layer substance.

The terms "layered", "layer", and "atomic layer substance" are as described above.

The structure of the present invention will be described using schematic diagrams.

Figure 1:
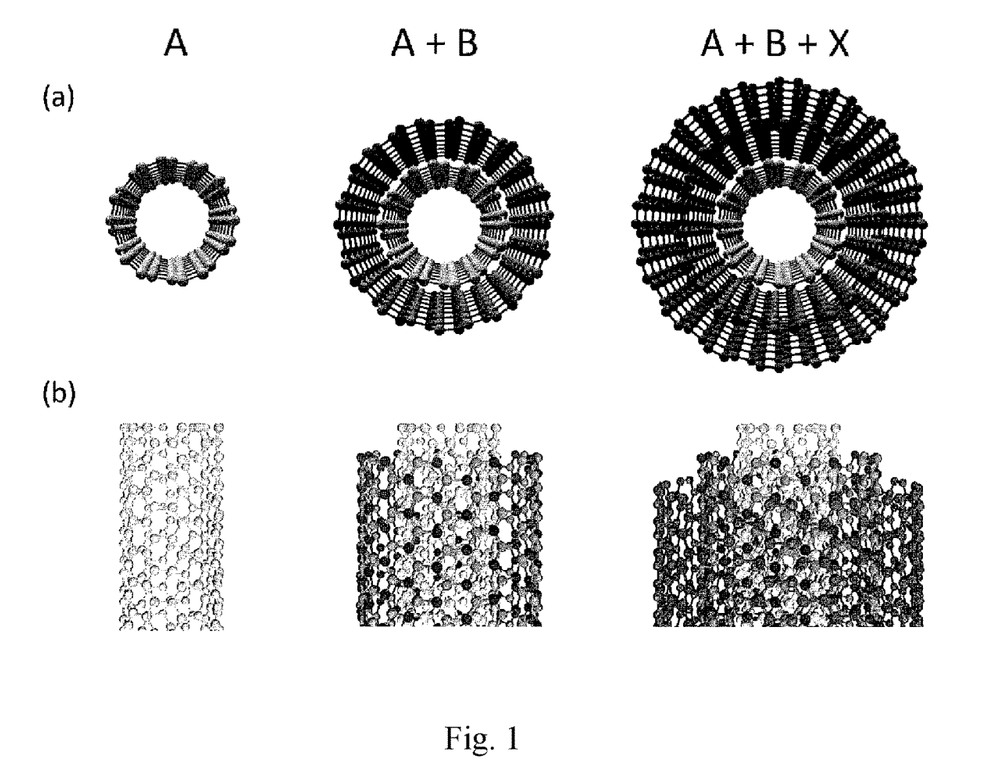
FIG. 1 is a diagram schematically showing a structure of the present invention.

FIG. 1 is a diagram schematically showing the structure of the present invention.

FIG. 1(a) is a view in the axial direction, in other words, a cross-sectional view of the 1st single-walled carbon nanotube in the axial direction, and FIG. 1(b) is a bird's-eye view.

In FIG. 1, A indicates the 1st single-walled carbon nanotube. In addition, B represents the 2nd layer or the 2'nd layer layered on the 1st single-walled carbon nanotube. X indicates a 3rd layer further layered on the 2nd layer.

Although the (n+1)-th layer is not shown in FIG. 1 where n is an integer of 3 or more, a layer Xn layered on the n-th layer may be further provided as an outer layer of "X" in FIG. 1.

<Film>, <Material>

The structure of the present invention can be applied to materials such as semiconductor electronic materials, solar cell materials, secondary battery materials, thermal interface materials, strength members, and additives to composite materials.

Accordingly, the present invention provides a material comprising the structure described above, for example a material having the applications described above.

The present invention also provides a film comprising a plurality of the structures described above. The film can also be applied to the above application.

<Method of Manufacturing Structure>

The present invention provides a method of manufacturing a structure comprising a 1st single-walled carbon nanotube and a 2nd layer layered on the 1st single-walled carbon nanotube, wherein the 2nd layer is made of at least one selected from the group A consisting of a first boron nitride, a first transition metal dichalcogenide, a second carbon, a first black phosphorus, and a first silicon.

The manufacturing method comprises the steps of:

1a) preparing a 1st single-walled carbon nanotube, and placing the prepared 1st single-walled carbon nanotube at a predetermined location;

1b) flowing a gas serving as a source of the 2nd layer into the predetermined location; and 1c) heating the predetermined location;

to obtain the above structure.

<<Step 1a)>>

The step 1a) is the step of preparing the 1st single-walled carbon nanotube, and placing the prepared 1st single-walled carbon nanotube at a predetermined location.

The above-mentioned 1st single-walled carbon nanotube can be used as the 1st single-walled carbon nanotube. The length may be, not particularly limited, but for example, 10 nm or more, preferably 50 nm or more, more preferably 100 nm or more, further preferably 1 µm or more, most preferably 10 µm or more.

The diameter may be 0.4 to 8 nm, preferably 0.6 to 5 nm, more preferably 0.7 to 4 nm, most preferably 1 to 3 nm, as described above.

When the 1st single-walled carbon nanotubes prepared in the step 1a) is a first film comprising a plurality of the 1st single-walled carbon nanotubes, the structure obtained by the method of the present invention can be a second film comprising a plurality of the structures.

Further, when the 1st single-walled carbon nanotube prepared in the step 1a) is a vertically aligned single-walled carbon nanotube, the structure obtained by the method of the present invention can be obtained in a state where the shape of the vertical alignment is substantially maintained. Similarly, when the 1st single-walled carbon nanotube prepared in the step 1a) is a horizontally aligned single-walled carbon nanotube, the structure obtained by the method of the present invention can be obtained in a state where the horizontally aligned shape is substantially maintained.

The predetermined location may be a location where the above-mentioned step 1b) and step 1c) can be suitably performed.

Figure 2:
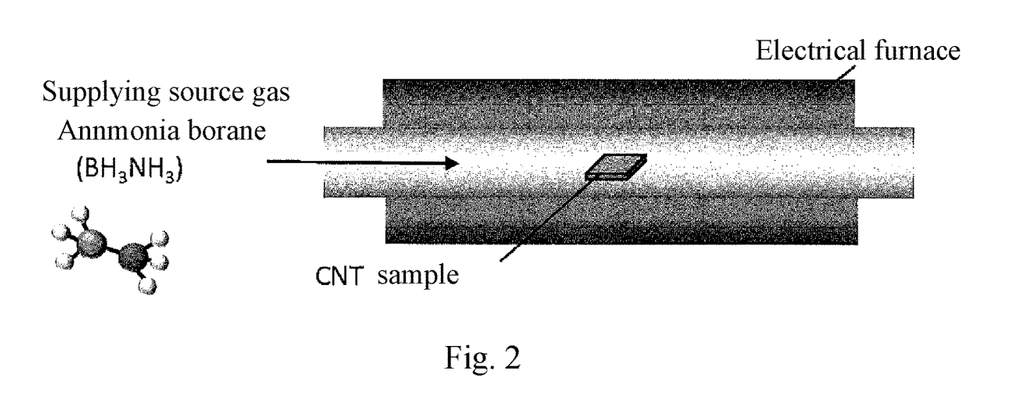
FIG. 2 is a diagram schematically showing an apparatus capable of carrying out the manufacturing method of the present invention.

As the predetermined location, for example, it is preferable to place the 1st single-walled carbon nanotube at a predetermined location of the apparatus having the configuration shown in FIG. 2.

FIG. 2 is a diagram schematically showing an apparatus having an installation location in the step 1a) and capable of performing steps 1b) and 1c).

In FIG. 2, a quartz tube 22 is disposed so as to penetrate the center of an electric furnace 21, and the 1st single-walled carbon nanotubes is disposed so as to be at the center of the electric furnace 21 in the quartz tube 22.

Although not shown in FIG. 2, a gas supply apparatus for the step 1b) described later is provided on the left side of the arrow. Further, although not shown in FIG. 2, a depressurizing apparatus including a vacuum pump for depressurizing or vacuuming the inside of the quartz tube 22 may be provided.

<<Step 1b)>>

The step 1b) is the step of flowing a gas serving as a source of the 2nd layer, into a predetermined location.

The gas serving as the source of the 2nd layer depends on the 2nd layer.

For example, when the 2nd layer is comprised of the boron nitride, examples of the gas may include, but are not limited to, a gas of a substance containing both the nitrogen atom and the boron atom, for example, a gas such as ammonia borane, borazine, and trimethylamine borane, for example, a pyrolysis gas. Specifically, the pyrolysis gas obtained by heating the ammonia borane powder, for example, to about 80° C. can be used, but is not limited thereto.

Further, both a gas supplying nitrogen atoms and a gas supplying boron atoms can be used.

Further, for example, when the 2nd layer is comprised of a transition metal dichalcogenide, a gas of a substance necessary for forming the transition metal dichalcogenide may be mentioned. Specifically, when the transition metal dichalcogenide is $MoS_2$, examples of a source of Mo may include, but are not limited to, $MoO_3$, and $C_{16}H_{10}Mo_2O_6W$ and examples of a source of S may include, but are not limited to, S powder, $H_2S$, and $C_2H_6S$. Although a case where the transition metal dichalcogenide is $MoS_2$ is described, the substance to be supplied and its gas can be selected as in $MoS_2$ for a case where the 2nd layer has another transition metal dichalcogenide.

More, for example, when the 2nd layer is comprised of carbon, the supply gas used in the method of manufacturing carbon nanotubes can be used.

Further, for example, when the 2nd layer is comprised of black phosphorus, for example, phosphorus powder (P powder) and the like can be used, but is not limited thereto.

More, for example, when the 2nd layer is comprised of silicon, for example, silane, disilane and the like can be used, but is not limited thereto.

Furthermore, the gas inflow rate and amount can be set appropriately.

In the step 1b), a carrier gas may be used when the gas is introduced. Examples of the carrier gas may include, but are not limited to, Ar, $Ar/H_2$, He, $He/H_2$, and $N_2$.

The flow amount and flow rate of the carrier gas can be set as appropriate, and the gas inflow rate and amount can be set accordingly.

<<Step 1c)>>

The step 1c) is the step of heating a predetermined location, for example, heating the predetermined location to the temperature required to form the 2nd layer from the gas, specifically, heating the predetermined location at the temperature of 700 to 1500° C., preferably 800 to 1400° C., more preferably 900 to 1300° C., when, for example, the 2nd layer is made of the first boron nitride, and at the temperature of 400 to 1200° C., preferably 450 to 1100° C., more preferably 450 to 1000° C., when, for example, the 2nd layer is made of the first transition metal dichalcogenide.

The heating time depends on the type of the desired 2nd layer, the number of layers of the 2nd layer, the gas to be used, the heating temperature and the like. In a case where, for example, the 2nd layer is made of the first boron nitride, when the heating temperature is constant at 1000° C., it is possible to obtain one layer in about 0.4 to 0.8 hours, 2 to 4 layers in about 1 hour, and 4 to 10 layers in about 3 hours. Therefore, the heating time can be appropriately selected depending on the type of the desired 2nd layer and the like.

<Method of Manufacturing a Structure in which a 3rd Layer is Layered>

The present invention provides a method of manufacturing a structure comprising a 3rd layer further layered on a structure in which the 2nd layer or the 2'nd layer is layered.

The method comprises the steps of:

2a) placing the structure comprising the 2nd layer or the 2'nd layer obtained above at a predetermined location;

2b) flowing a gas serving as a source of the 3rd layer into the predetermined location; and 2c) heating the predetermined location;

to obtain the structure comprising a 3rd layer layered on the 2nd layer.

<<Step 2a)>>

The step 2a) is the step of placing the structure comprising the 2nd layer or the 2'nd layer obtained above at a predetermined location.

Specifically, it is preferable to place the structure at the location described in the above step 1a), specifically, at the predetermined location of the apparatus illustrated in FIG. 2.

<<Step 2b)>>

The step 2b) is the step of flowing a gas serving as a source of the 3rd layer into the predetermined location.

The step 2b) can be the same step as the step 1b) described above, except that the "2nd layer" in the step 1b) above is changed to the "3rd layer".

<<Step 2c)>>

The step 2c) is the step of heating the predetermined location.

The step 2c) is the same step as the step 1c) described above, except that the "2nd layer" in the step 1c) above is changed to the "3rd layer".

<Method of Manufacturing a Structure Comprising an (m+1)-Th Layer>

The present invention provides a method of manufacturing a structure comprising an (m+1)-th layer further layered on an m-th layer where m is an integer of 3 or more.

The method comprises the steps of:

ma) placing the structure comprising an m-th layer at a predetermined location; mb) flowing a gas serving as a source of the (m+1)-th layer into the predetermined location where m is an integer of 3 or more; and mc) heating the predetermined location:

to obtain the structure comprising the (m+1)-th layer layered on the m-th layer.

Steps ma), mb), and mc) may be the same as steps 2a), 2b), and 2c) where m is an integer of 3 or more, respectively.

Moreover, this application provides the following inventions in an aspect.

The present application provides a structure comprising a 1st single-walled carbon nanotube and a 2nd layer layered on the 1st single-walled carbon nanotube, and the 2nd layer is made of at least one selected from the group A consisting of a first boron nitride, a first transition metal dichalcogenide (for example, $MoS_2$, $WSe_2$), a second carbon, a first black phosphorus, and a first silicon.

The structure of the present invention will be described using schematic diagrams.

FIG. 1 is a diagram schematically showing the structure of the present invention.

FIG. 1(a) is a view in the axial direction, in other words, a cross-sectional view of the 1st single-walled carbon nanotube in the axial direction, and FIG. 1(b) is a bird's-eye view.

In FIG. 1, A indicates the 1st single-walled carbon nanotube. In addition, B indicates the 2nd layer layered on the 1st single-walled carbon nanotube. X indicates a 3rd layer further layered on the 2nd layer.

Although the (n+1)-th layer is not shown in FIG. 1 where n is an integer of 3 or more, a layer Xn layered on the n-th layer may be further provided as an outer layer of "X" in FIG. 1.

The 1st single-walled carbon nanotube may have a length of 4 μm or more, preferably 10 μm or more, more preferably an order of several hundred micrometers.

The 1st single-walled carbon nanotube may have a diameter of 0.4 to 8 nm, preferably 0.8 to 3 nm.

The form of the 1st single-walled carbon nanotubes may be selected from the group consisting of a vertically aligned single-walled carbon nanotube, a suspended single-walled carbon nanotube, a horizontally aligned single-walled nanotube, and a randomly aligned single-walled carbon nanotube (for example, a film composed of a plurality of the randomly aligned single-walled carbon nanotubes).

The group A may consist of at least one selected from the group A' consisting of the first boron nitride and the second carbon. The 2nd layer made of the second carbon may be a single layer. The 2nd layer made of the first boron nitride may be 1 layer to 10 layers.

The 2nd layer may be tubular, preferably tubular substantially coaxial with the 1st single-walled carbon nanotube.

The 2nd layer may have a diameter having several nanometers.

In an aspect, the present application may have a 3rd layer further layered on the 2nd layer, preferably a 3rd layer which is a tubular layer, more preferably a 3rd layer which is a tubular layer substantially coaxial with the 1st single-walled carbon nanotube, and the 3rd layer may be made of at least one from the group B consisting of a second boron nitride, a second transition metal dichalcogenide, a third carbon, a second black phosphorus, and a second silicon.

In an aspect, the present application may have an (n+1)-th layer further layered on an n-th layer, preferably an (n+1)-th layer which is a tubular layer, more preferably an (n+1)-th layer which is a tubular layer substantially coaxial with the 1st single-walled carbon nanotubes where n represents an integer of 3 or more, and the (n+1)-th layer may be made of at least one selected from the group C consisting of an n-th boron nitride, an n-th transition metal dichalcogenide, an (n+1)-th carbon, an n-th black phosphorus, and an n-th silicon.

The present application provides a film comprising a plurality of the structures described above.

More, in an aspect, the present application provides a method for producing the structure described above.

The present application provides a method of manufacturing a structure comprising a 1st single-walled carbon nanotube and a 2nd layer layered on the 1st single-walled carbon nanotube, where the 2nd layer is made of at least one selected from the group A consisting of a first boron nitride, a first transition metal dichalcogenide, a second carbon, a first black phosphorus, and a first silicon. The method comprises the steps of:

1a) preparing the 1st single-walled carbon nanotube, and placing the prepared 1st single-walled carbon nanotube at a predetermined location;

1b) flowing a gas serving as a source of the 2nd layer into the predetermined location; and 1c) heating the predetermined location; to obtain the above structure.

The step of 1c) heating may be carried out by heating the predetermined location to, for example, a temperature required to form the 2nd layer from the gas, specifically, heating the predetermined location to, for example, 800 to 1200° C., for example 1000 to 1050° C.

The 1st single-walled carbon nanotube prepared in the step 1a) may be a first film comprising a plurality of the 1st single-walled carbon nanotubes, and the structure may be a second film comprising a plurality of the structures.

The single-walled carbon nanotube prepared in the above step 1a) may have a length of 4 μm or more, preferably 10 μm or more, more preferably several hundreds of μm.

The present invention provides a method of manufacturing a structure, comprising the steps of:

2a) placing the structure obtained by the method according to any one of the above at a predetermined location;

2b) flowing a gas serving as a source of a 3rd layer into the predetermined location; and 2c) heating the predetermined location; to obtain the structure comprising a 3rd layer layered on the 2nd layer.

The step of 2c) heating may be carried out by heating the predetermined location to, for example, a temperature required to form the 3rd layer from the gas.

More, the present application can provide a method comprising the steps of:

ma) placing the structure comprising an m-th layer at a predetermined location;

mb) flowing a gas serving as a source of an (m+1)-th layer into the predetermined location where m is an integer of 2 or more; and mc) heating the predetermined location;
to obtain the structure comprising the (m+1)-th layer layered on the m-th layer.

In the above step hb), where h is an integer of 1 or more, a carrier gas, for example, Ar or Ar/H$_2$ may be flowed in.

Specifically, the structure can be obtained by the following procedure of synthesis:

(1) The single-walled CNT sample that serves as a template was placed in a synthesis apparatus comprising a quartz tube, an electric furnace, a vacuum pump, a gas supply mechanism and the like. The electric furnace was heated to a synthesis temperature of about 1000 to 1050° C. The synthesis temperature is an example, and the temperature range may be 800 to 1200° C.

(2) The Ar/H$_2$ as a carrier gas was flowed at about 300 sccm and about 300 Pa. The experiment conditions are not limited thereto. It is conceived that the carrier gas is unused, or Ar or Ar/H$_2$ is used as the carrier gas, and is flowed at 10 to 5000 sccm and 10 Pa to 100 kPa. Further, the inflow rate depends on the performance of the apparatus.

(3) In parallel with the above, the ammonia borane powder as a source was heated to about 80° C., and the pyrolysis gas was supplied to the single-walled CNT sample, but the experimental conditions are not limited thereto. The heating temperature may be in the range of 50 to 150° C.

Further, as the source, a substance containing the nitrogen atom and the boron atom, such as borazine or trimethylamine borane, can be used.

(4) After the synthesis time of about 30 minutes to 3 hours, the supply of the source gas is stopped to lower the temperature of the electric furnace. When the sample temperature has dropped sufficiently, the apparatus is opened to take out the sample.

The single-walled CNT has a diameter of 0.8 to 3 nm, but the diameter is an example. The single-walled CNT having a diameter of 0.4 to 8 nm can be used.

It was confirmed that the BN layer covering almost all or all the surface of the synthesized CNT was generally uniform.

The present invention can be expected to be utilized in semiconductor electronic materials, solar cell materials, secondary battery materials, thermal interface materials, strength members, and additives to composite materials.

Hereinafter, the present invention will be described in more detail based on examples, but is not limited thereto.

Example 1

<Synthesis of BNNT Layered on Single-Walled CNT Using Vertically Aligned Single-Walled CNT>

The layered body 1B was obtained by two steps shown in FIG. 3(a), that is, a first step of obtaining a single-walled CNT vertically aligned to the substrate on the substrate (the step 1A described later), and a second step of layering a BNNT (boron nitride nanotube) layer on the vertically aligned single-walled CNT obtained in the first step (the step 1B described later).

<<1A. Preparation of Vertically Aligned Single-Walled CNT>>

Using an Si substrate (silicon substrate) or a quartz substrate as the substrate, a single-walled CNT vertically aligned on the substrate (referred to as "vertically aligned single-walled CNT 1A") was prepared by alcohol-catalyzed CVD (ACCVD) described in Y Murakami et al., Chemical Physics Letter, 385, 298 (2004).

<<1B. Synthesis of Layered Body of BNNT Layer on Vertically Aligned Single-Walled CNT 1A>>

The vertically aligned single-walled CNT 1A obtained above was placed in a synthesis apparatus comprising a quartz tube, an electric furnace, a vacuum pump, a gas supply mechanism, and the like.

The electric furnace was heated to a synthesis temperature of about 1000 to 1050° C. While the Ar/H$_2$ as a carrier gas was flowed at about 300 sccm and about 300 Pa, a pyrolysis gas obtained by heating the ammonia borane powder serving as the source of the layer of boron nitride (BN) to about 80° C. was supplied to the vertically aligned single-walled CNT 1A for 30 minutes. Then, the supply of the pyrolysis gas was stopped, followed by cooling the electric furnace, to obtain the layered body 1B in which the BNNT layer was layered on the vertically aligned single-walled CNT 1A.

<<Optical Absorption Spectroscopy and Raman Spectroscopy>>

The absorption spectra and Raman spectra of the vertically aligned single-walled CNT 1A and the layered body 1B were determined by optical absorption spectroscopy and Raman spectroscopy, respectively.

Figure 3:
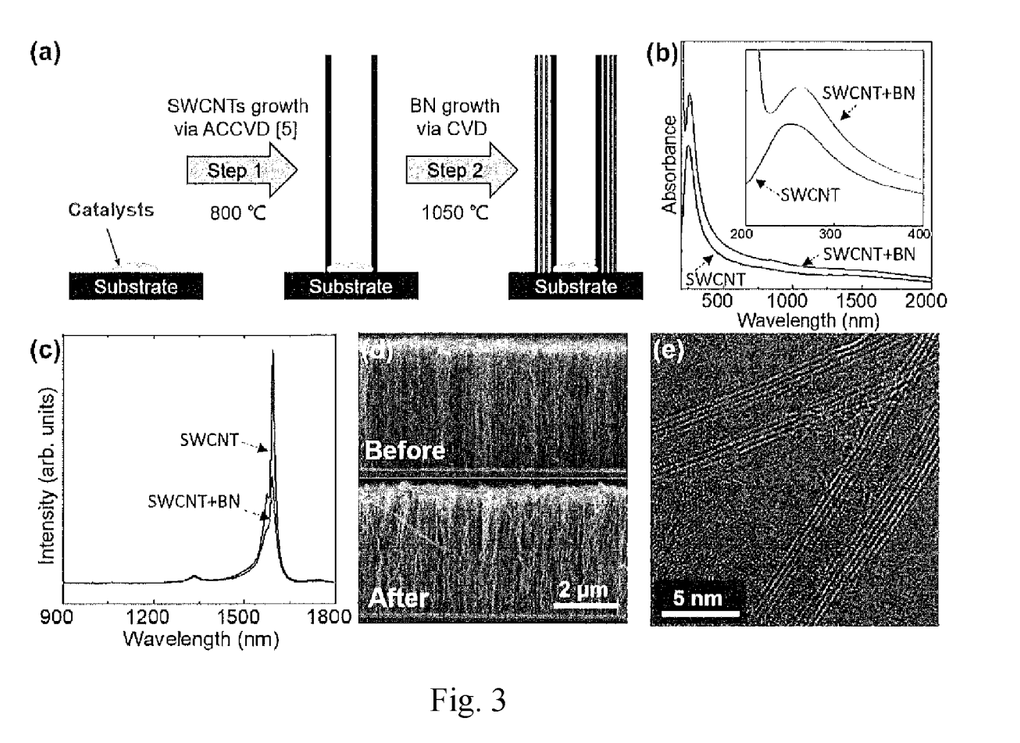
FIG. 3(a) shows two steps of the manufacturing method in Example 1.
FIG. 3(b) shows absorption spectra of a vertically aligned single-walled CNT 1A and a layered body 1B in Example 1.
FIG. 3(c) shows Raman spectra of the vertically aligned single-walled CNT 1A and the layered body 1B in Example 1.
FIG. 3(d) shows a scanning electron microscope (SEM) image of a cross section of the vertically aligned single-walled CNT 1A ("Before" in the figure) and the layered body 1B ("After" in the figure) in Example 1.
FIG. 3(e) shows a transmission electron microscope (TEM) image of the layered body 1B in Example 1.

FIG. 3(b) shows absorption spectra of the vertically aligned single-walled CNT 1A and the layered body 1B. Furthermore, FIG. 3(b) was obtained by using a quartz substrate as the substrate.

Further, FIG. 3(c) shows Raman spectra of the vertically aligned single-walled CNT 1A and the layered body 1B.

FIGS. 3(b) and 3(c) show that the BNNT layer is formed in the layered body 1B, and that the vertically aligned single-walled CNT 1A is not collapsed.

<<Scanning Electron Microscope (SEM) Image and Transmission Electron Microscope (TEM) Image>>

Cross sections of the vertically aligned single-walled CNT 1A and the layered body 1B were determined by the scanning electron microscope (SEM) (FIG. 3(d)).

Further, the layered body 1B was determined by the transmission electron microscope (TEM) (FIG. 3(e)).

FIG. 3(d) shows that the vertical alignment of the vertically aligned single-walled CNT 1A (indicated by "Before" in the figure) is maintained also in the layered body 1B (indicated by "After" in the figure). Further, it shows that the length of the single-walled CNT of the vertically aligned single-walled CNT 1A is about 4 μm, and that the length of the layered body 1B is also about 4 μm.

Further, the TEM image (FIG. 3(e)) shows that one or more layers of the BNNT are layered on the vertically aligned single-walled CNT 1A. Further, the SEM image (FIG. 3(d)) and the TEM image (FIG. 3(e)) show that the diameter of the single-walled CNT of the vertically aligned single-walled CNT 1A is about 0.8 to 3 nm, that the diameter of the layered body 1B is about 5 nm, and that the diameter of layered body 1B increased from the diameter of single-walled CNT of vertically aligned single-walled CNT 1A.

From the above, it is understood that the present example yielded the layered body 1B in which one or more BNNT layers were layered on the vertically aligned single-walled CNT 1A.

Example 2

<Synthesis of BNNT Layered on Single-Walled CNT Using Single-Walled CNT Random Film>

The layered bodies 2B and 23 were obtained in a manner similar to Example 1, except that the single-walled CNT random film 2A was used instead of the "vertically aligned single-walled CNT 1A" in Example 1.

The single-walled CNT random film 2A, which was synthesized by the aerosol CVD method, was provided by Professor Kauppinen of Aalto University. Regarding the synthesis of the BNNT layer, the layered body 2B was obtained with 1 hour, and the layered body 23 was obtained with 3 hours instead of 30 minutes in Example 1.

The layered bodies 2B and 2B' were also in film form, as in the single-walled CNT random film 2A.

Figure 4:
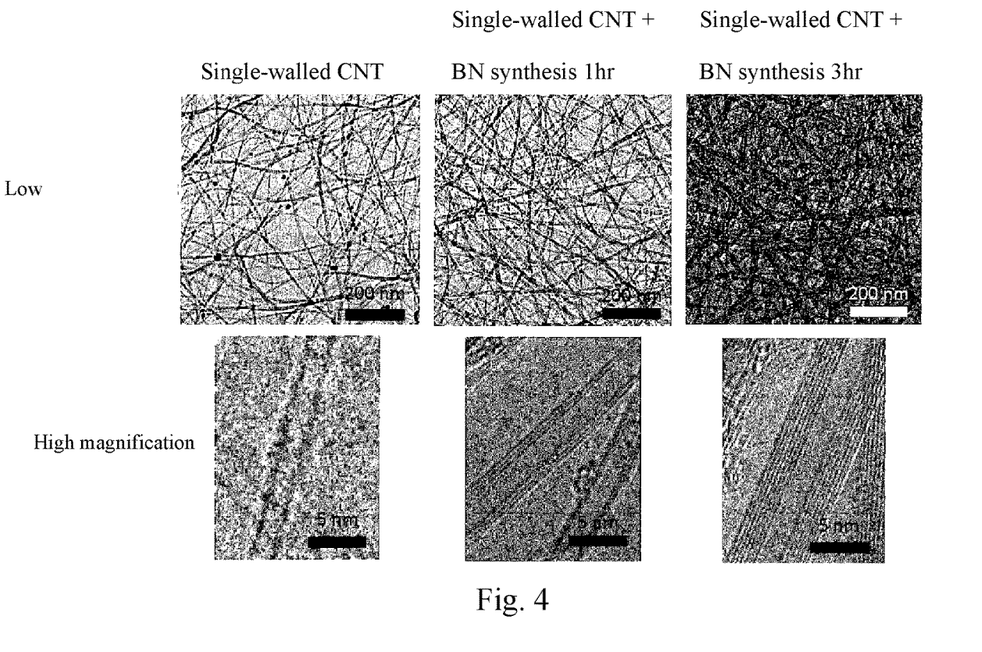
FIG. 4 shows TEM images of a single-walled CNT random film 2A, a layered body 2B and a layered body 2B' in Example 2.

The TEM images of the single-walled CNT random film 2A, the layered body 2B and the layered body 23 were observed (FIG. 4).

The TEM images (FIG. 4) shows that the film is formed by the random presence of a plurality of layered bodies in which the BNNT layers are layered on the single-walled CNT.

Also, the TEM images (FIG. 4) shows that the BNNT layer of the layered body 23 having the synthesis time of 3 hours has an increased BNNT layer than the BNNT layer of the layered body 2B having the synthesis time of 1 hour.

More, the TEM images (FIG. 4) shows that the diameter of the single-walled CNT of the single-walled CNT random film 2A is about 1 nm to 3 nm, that the diameter of the layered body 2B is about 4 nm to 7 nm, and that the diameter of the layered body 23 is about 7 nm to 15 nm.

Therefore, regarding the synthesis of the BNNT layers, it can be seen that when the conditions other than the synthesis time are the same, the thickness of the layer increases with time and a plurality of layers is formed.

Example 3

<Synthesis of Boron Nitride Layer Layered on the Single-Walled CNT Using Horizontally Aligned Single-Walled CNT>

The layered body 3B was obtained in a manner similar to Example 1, except that a horizontally aligned single-walled CNT 3A was used instead of the "vertically aligned single-walled CNT 1A" in Example 1.

The horizontally aligned single-walled CNT 3A was synthesized using a single crystal quartz substrate, and the single-walled CNT of the horizontally aligned single-walled CNT 3A was a single-walled CNT that was horizontal to the substrate and disposed in one direction along the crystal orientation of the substrate. Further, the boron nitride layer was synthesized with 30 minutes as in Example 1.

Figure 5:
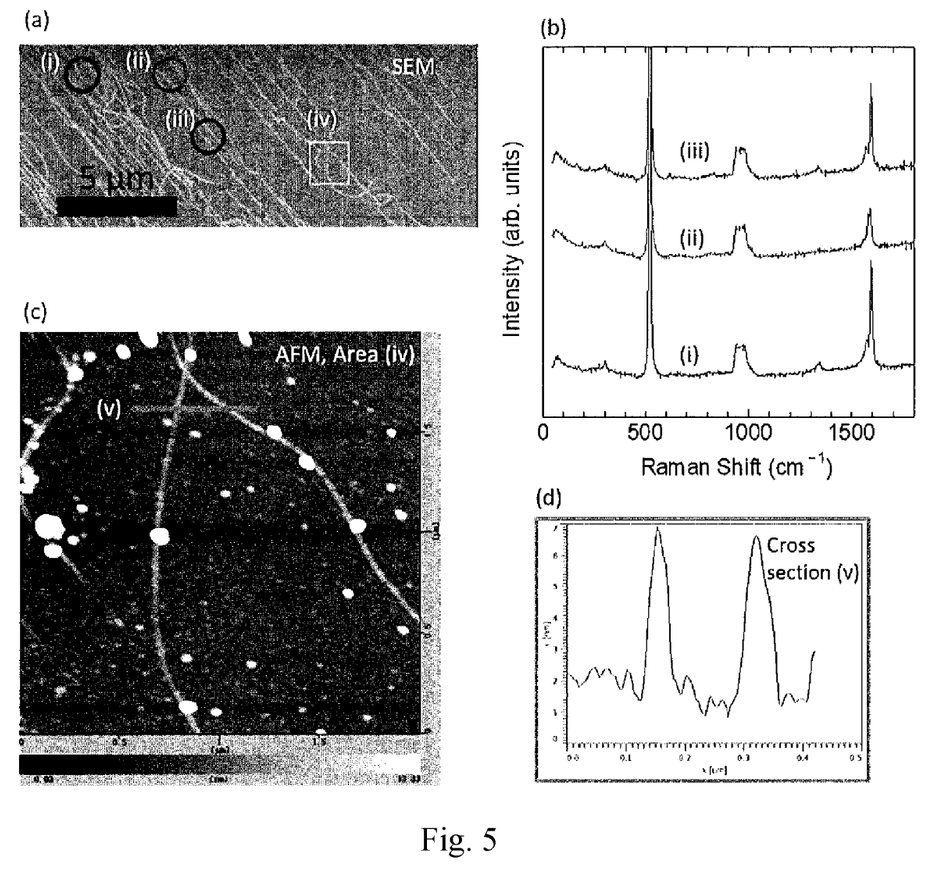
FIG. 5(a) shows a SEM image of a layered body 3B in Example 3.
FIG. 5(b) shows the Raman spectra of the respective locations (i) to (iii) in the SEM image of FIG. 5(a) for the layered body 3B.
FIG. 5(c) shows an atomic force microscope (AFM) image of the location (iv) in the SEM image of FIG. 5(a) for the layered body 3B.
FIG. 5(d) shows the height profile of the line segment (v) in FIG. 5(c).

When the SEM image of the layered body 3B was determined in a manner similar to Example 1 (FIG. 5(a)), it was confirmed that the single-walled CNT with a length of several hundred micrometers lying on the substrate, and a horizontally aligned tube structure existed.

Further, when the Raman spectrum of the layered body 3B was determined in a manner similar to Example 1 (FIG. 5(b)), it was confirmed that the single-walled CNT structure was preserved. In addition, the Raman spectrum was determined for each of the locations (i) to (iii) in the SEM image of FIG. 5(a).

More, when the layered body 3B was determined (FIG. 5(c)) with the atomic force microscope (AFM), it can be seen that while the layered body 3B has 2 nm or less before the BNNT layer is formed (corresponding to the diameter of the single-walled CNT of the horizontally aligned single-walled CNT 3A), the layered body 3B has about 5 nm after the boron nitride layer is formed (corresponding to the diameter of the layered body 3B). Further, from these, it is understood that the boron nitride layer is layered on the single-walled CNT.

Further, FIG. 5(d) is a diagram showing the height profile of the line segment (v) in FIG. 5(c), and it can be seen that the diameter of the tube structure is about 5 nm.

Example 4

<Production of Field-Effect Transistor (FET) from Layered Body 3B and its Evaluation>

Using the layered body 3B obtained in Example 3, a field effect transistor (FET) structure in which electrodes were connected by a plurality of tubular layered bodies was produced and evaluated.

Specifically, the layered body 3B obtained in Example 3 was transferred to a highly doped silicon substrate with an oxide film of 100 nm to pattern the metal electrode by photolithography or electronic lithography, and vacuum deposition to produce a back gate type field effect transistor structure.

Figure 6:
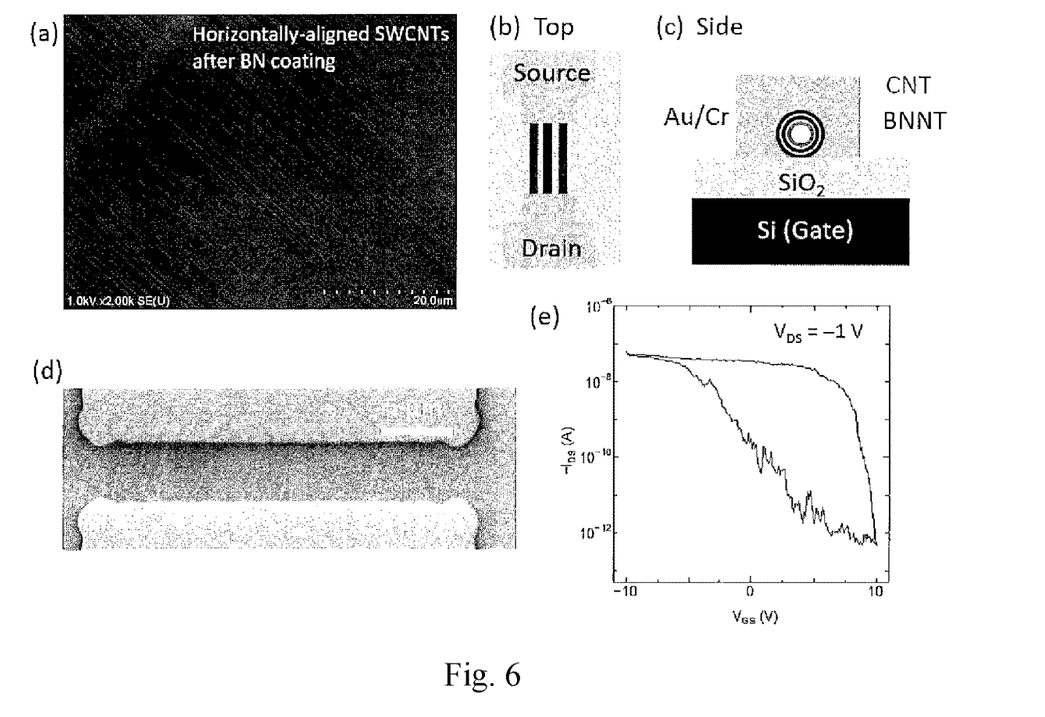
FIG. 6(a) shows a SEM image of the layered body 3B.
FIGS. 6(b) and 6(c) are schematic views of the FET produced in Example 4 in upper view and in sectional view, respectively.
FIG. 6(d) shows a SEM image of the FET produced in Example 4.
FIG. 6(e) is a graph showing electrical characteristics, of the FET produced in Example 4, measured using a semiconductor parameter analyzer, specifically, a change in the drain current with respect to the gate voltage.

FIG. 6(a) shows a SEM image of a horizontally aligned single-walled CNT obtained by synthesizing a BN layer, that is, the layered body 3B. Further, FIG. 6(b) is a schematic view of the FET produced in this example in upper view, and FIG. 6(c) is a schematic view in sectional view. FIG. 6(d) shows a SEM image of the FET produced in this example. The metallic single-walled CNT was cut by the electrical breakdown method. The electrical characteristics of this FET were measured using a semiconductor parameter analyzer. FIG. 6(e) shows the change in drain current with respect to the gate voltage.

These figures show that the BN coating did not cause adverse effects such as a significant decrease in the electrical conduction characteristics of the single-walled CNT.

Example 5

<Thermal Stability of Layered Body 3B>

The thermal stability of the layered body 3B obtained in Example 3 was determined.

The single-walled CNT is known to burn out at about 450° C. in air.

Figure 7:
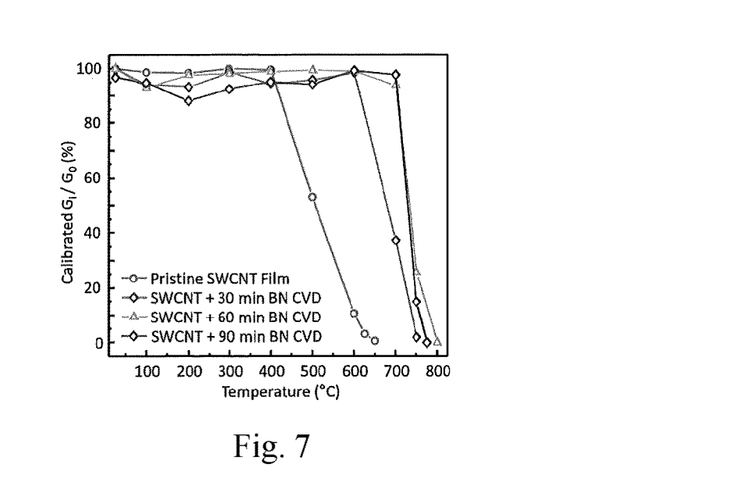
FIG. 7 is a graph showing the thermal stability of the layered body 3B in Example 3, specifically, a graph in which the horizontal axis is the heating temperature, and the vertical axis is the G band intensity (corresponding to the amount of CNT) obtained by measuring after cooling to room temperature after heating, and performing correction based on the G band intensity in the initial state plotted.

On the other hand, when the thermal stability of the single-walled CNT was measured using the layered body 3B, it has been found that the single-walled CNT withstands up to about 700° C. as shown in FIG. 7.

Furthermore, FIG. 7 was determined as follows: That is, the operation of raising the sample temperature to a constant temperature and then lowering it to room temperature, and measuring the G band intensity of the Raman spectra was repeated while successively raising the heating temperature. FIG. 7 is a graph in which the horizontal axis is the heating temperature and the vertical axis is the G band intensity (corresponding to the amount of CNT) corrected with the G band intensity in the initial state as a reference plotted.

Example 6

<Synthesis of BNNT Layer Layered on Suspended Single-Walled CNT>
<<6A. Preparation of Suspended Single-Walled CNT>>

A suspended single-walled CNT 6A was prepared by the alcohol-catalyzed CVD in a manner similar to Example 1 on the Si substrate finely processed in a columnar shape.

<<6B. Synthesis of Layered Body of BNNT Layer on Suspended Single-Walled CNT 6A>>

The layered body 6B was prepared in a manner similar to Example 1, specifically, the step 1B in Example 1.

Figure 8:
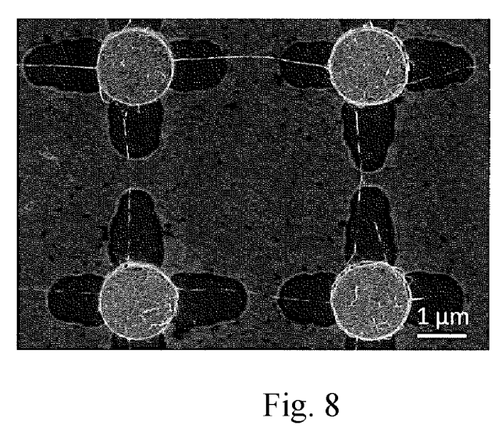
FIG. 8 shows a SEM image of a layered body 6B obtained in Example 6.

The SEM image of the obtained layered body 6B was observed (FIG. 8).

FIG. 8 shows that the tube structure is in a suspended state as in before the BN synthesis.

Therefore, even when the suspended single-walled CNT is used, the layered body 6B is synthesized as a state where the BNNT layer is layered on the suspended single-walled CNT.

Example 7

<Synthesis of MoS$_2$ Nanotube Layered on Single-Walled CNT>
<<7A. Single-Walled CNT Random Film>>

A single-walled CNT random film 7A as in Example 2 was used as the single-walled CNT.

<<7C. Synthesis of Layered Body of MoS$_2$ Nanotube Layer on Vertically Aligned Single-Walled CNT 7A>>

The MoS$_2$ nanotube layer was prepared by the chemical vapor deposition (CVD). Specifically, it was prepared as follows:

The single-walled CNT random film 7A was placed in a synthesis apparatus comprising a quartz tube, an electric furnace, a vacuum pump, a gas supply mechanism, and the like.

The electric furnace was heated to a synthesis temperature of about 400 to 600° C. The S powder serving as a source of the MoS$_2$ layer was disposed upstream of the single-walled CNT random film 7A and heated to 100 to 130° C. Further, the MoO$_3$ serving as a source of the MoS$_2$ layer, was disposed next to the S powder and heated at 500 to 600° C. These vapor phases were supplied to the single-walled CNT random film 7A for 5 to 70 minutes while Ar was flowed as a carrier gas at 50 sccm. Then, the gas supply was stopped, followed by cooling the electric furnace, to obtain the layered body 7C in which the MoS$_2$ nanotube layer was layered on the single-walled CNT random film 7A.

Figure 9:
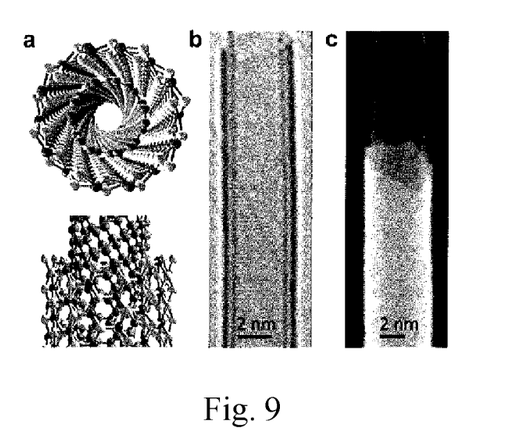
FIG. 9a is a diagram schematically showing a cross-sectional view and a side view of a layered body 7C obtained in Example 7.
FIGS. 9b and 9c show a high-resolution transmission electron microscope (HRTEM) image and a high-angle annular dark-field scanning transmission electron microscope (HAADF STEM) image of the layered body 7C, respectively.

The obtained layered body 7C was determined by a high-resolution transmission electron microscope (HRTEM) and a high-angle annular dark-field scanning transmission electron microscope (HAADF STEM) (FIG. 9).

FIG. 9a is a diagram schematically showing a cross section and a side surface of a layered body 8C.

The HRTEM image of FIG. 9b shows that the diameter of the single-walled CNT of the single-walled CNT random film 7A is about 3 nm, and that the diameter of the layered body 7C is about 4 nm.

The HAADF STEM image of FIG. 9c shows that the MoS$_2$ nanotube single layer is layered on the single-walled CNT of the single-walled CNT random film 7A.

Example 8

<Synthesis of BNNT Layered on Single-Walled CNT Including Single-Walled CNT Random Film, and Synthesis of MoS$_2$ Nanotubes Layered on the BNNT Layer>
<<8A. Preparation of Single-Walled CNT Random Film>>

As in Example 2, the single-walled CNT random film 8A synthesized by the aerosol CVD method was provided by Professor Kauppinen of Aalto University.

The single-walled CNT random film 8A placed on a ceramic washer (see FIG. 10e) was used. As can be seen from FIG. 10e, the single-walled CNT random film 8A was colorless and transparent, and the logo disposed below was seen through.

<<8B. Synthesis of Layered Body of BNNT Layer on Single-Walled CNT Random Film 8A>>

The layered body 8B was prepared in a manner similar to Example 1, specifically, the step 1B in Example 1. The layered body 8B was also transparent as in the single-walled CNT random film 8A, and the logo disposed below was seen through.

<<8C1. Synthesis of layered body of MoS$_2$ nanotube layer on layered body 8B>>

A layered body 8C1 was prepared in a manner similar to Example 7, specifically, the step 7C in Example 7.

<<8C2. Synthesis of layered body of MoS$_2$ nanotube layer on layered body 8B>>

In the Step 7C in Example 7, the layered body 8C2 was prepared in a manner similar to Example 7, specifically, the step 7C in Example 7, except that C$_2$H$_6$S was used instead of the S powder, and C$_{16}$H$_{10}$Mo$_2$O$_6$ was used instead of MoO$_3$, and N$_2$ was used instead of Ar as a carrier gas.

The layered body 8C2 was also transparent as in the single-walled CNT random film 8A, and the logo disposed below was seen through.

Figure 10:
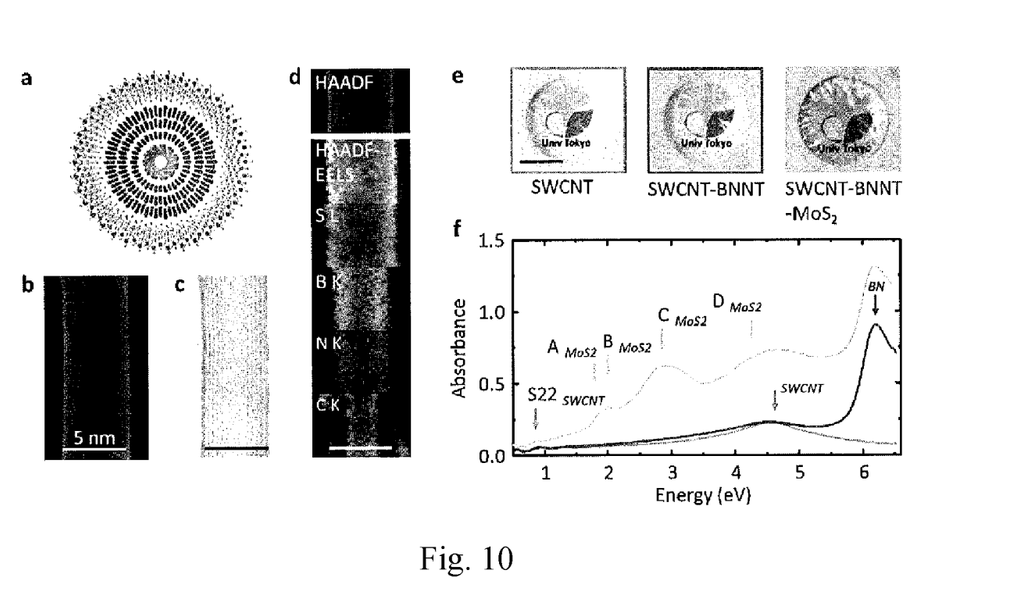
FIG. 10A is a diagram schematically showing a cross-sectional view and a side view of a layered body 8C2 obtained in Example 8.
FIG. 10b shows an HAADF STEM image of the layered body 8C2.
FIG. 10c shows an HRTEM image of the layered body 8C2.
FIG. 10d shows an HAADF STEM image and an electron energy loss spectroscopy mapping image of the layered body 8C2.
FIG. 10e shows photos from above of a single-walled CNT random film 8A used in Example 8, placed on a ceramic washer, a layered body 8B obtained in Example 8, and an 8C2 obtained in Example 8 in order from the left.
FIG. 10f is a graph showing absorption spectra of the three kinds of films shown by FIG. 10e.

The obtained layered body 8C1 was determined by a high-resolution transmission electron microscope (HRTEM) and a high-angle annular dark-field scanning transmission electron microscope (HAADF STEM) (FIG. 10).

The HAADF STEM images in FIGS. 10b and 10d show that the BNNT layer is layered on the single-walled CNT, and that the MoS$_2$ nanotube layer is layered on the BNNT layer.

Also, the HRTEM image of FIG. 10c shows that the diameter of the single-walled CNT of a single-walled CNT 8 is about 2 nm, that the diameter of the layered body 8B in which the BNNT layer is layered on a single-walled CNT 8A is about 4 nm, and that the diameter of the layered body 8C in which the MoS$_2$ nanotube layer is layered on the BNNT layer is about 5 nm.

Further, FIG. 10f is a graph showing absorption spectra of the three kinds of films of FIG. 10e. The graph shows that only the peak of the single-walled CNT appears from the single-walled CNT random film 8A, an additional BN peak appears in the layered body 8B of the BNNT layer, and an additional peak of MoS$_2$ appears in a layered body 8C1 of the MoS$_2$ nanotube layer.

What is claimed is:

1. A structure comprising a $1^{st}$ single-walled carbon nanotube having a length of 50 nm or more and a $2^{nd}$ tubular layer layered on and substantially coaxial with the 1st single-walled carbon nanotube, consisting of a two-dimensional atomic structure having a layer thickness of at least one atom, and made of at least one compound selected from the group A consisting of a first boron nitride, a first transition metal dichalcogenide, a first black phosphorus, and a first silicon.

2. The structure according to claim 1, wherein the $2^{nd}$ tubular layer has two or more layers.

3. The structure according to claim 1, further comprising a 3rd layer layered on the 2nd layer, and made of at least one compound selected from the group B consisting of a second boron nitride, a second transition metal dichalcogenide, a third carbon, a second black phosphorus, and a second silicon.

4. The structure according to claim 3, wherein the n-th layer has a single layer or two or more layers where n represents an integer of 3 or more.

5. The structure according to claim 1, further comprising an (n+1)-th layer layered on an n-th layer where n represents an integer of 3 or more, and made of at least one selected from the group C consisting of an n-th boron nitride, an n-th transition metal dichalcogenide, an (n+1)-th carbon, an n-th black phosphorus, and an n-th silicon.

6. The structure according to claim 1, wherein the 1st single-walled carbon nanotube has a diameter of 0.4 to 8 nm.

7. A film comprising a plurality of structures according to claim 1.

8. A structure comprising a $1^{st}$ single-walled carbon nanotube having a length of 10 nm or more and a 2'nd tubular layer layered on and substantially coaxial with the $1^{st}$ single-walled carbon nanotube, consisting of a two-dimensional atomic structure having a single atom layer thickness, and made of at least one compound selected from the group A consisting of a first boron nitride, a first transition metal dichalcogenide, a first black phosphorus, and a first silicon.

9. The structure according to claim 8, further comprising an (n+1)-th layer layered on an n-th layer where n represents an integer of 3 or more, wherein the (n+1)-th layer is made of at least one selected from the group C consisting of an n-th boron nitride, an n-th transition metal dichalcogenide, an (n+1)-th carbon, an n-th black phosphorus, and an n-th silicon.

10. The structure according to claim 8, further comprising a 3rd layer layered on the 2'nd layer, wherein the 3rd layer is made of at least one selected from the group consisting of a second boron nitride, a second transition metal dichalcogenide, a third carbon, a second black phosphorus, and a second silicon.

11. The structure according to claim 10, wherein the n-th layer has a single layer or two or more layers where n represents an integer of 3 or more.

12. A method of manufacturing a structure comprising a 1st single-walled carbon nanotube and a $2^{nd}$ tubular layer layered on and substantially coaxial with the 1st single-walled carbon nanotube, and consisting of an atomic layer structure made of at least one selected from the group A consisting of a first boron nitride, a first transition metal dichalcogenide, a first black phosphorus, and a first silicon, the method comprising the steps of:
   1a) preparing the 1st single-walled carbon nanotube, and placing the prepared 1st single-walled carbon nanotube at a predetermined location;
   1b) flowing a gas serving as a source of the 2nd layer into the predetermined location; and
   1c) heating the predetermined location,
to obtain a structure comprising a unit structure comprising the single-walled carbon nanotube with said second layer.

13. The method according to claim 12, wherein the 1st single-walled carbon nanotube prepared in the step 1a) is a first film comprising a plurality of the 1st single-walled carbon nanotubes, the 2nd layer is layered on the first film, and the obtained structure is a second film comprising a plurality of the unit structures.

14. The method according to claim 12, wherein an Ar or an Ar/H2 carrier gas is flowed in an hb) step where h is an integer of 1 or more.

15. The method according to claim 12, wherein the single-walled carbon nanotube prepared in the step 1a) has a length of 10 nm or more.

16. A method of manufacturing a structure, the method comprising the steps of:
   2a) placing the structure obtained by the method according to claim 12 at a predetermined location;
   2b) flowing a gas serving as a source of a 3rd layer into the predetermined location; and
   2c) heating the predetermined location,
to obtain a structure comprising the 3rd layer layered on the 2nd layer of the structure.

17. The method of manufacturing the structure according to claim 16, further comprising the steps of:
   ma) placing a structure comprising an m-th layer at a predetermined location;
   mb) flowing a gas serving as a source of an (m+1)-th layer into the predetermined location where m is an integer of 2 or more; and
   mc) heating the predetermined location,
   to obtain the structure comprising the (m+1)-th layer layered on the m-th layer of the structure.

\* \* \* \* \*